United States Patent [19]
Radin

[11] 4,170,110
[45] Oct. 9, 1979

[54] COMBUSTION PROCESS

[76] Inventor: Edward Radin, 901 Ave. H, Brooklyn, N.Y. 11230

[21] Appl. No.: 706,845

[22] Filed: Jul. 19, 1976

[51] Int. Cl.² .......................................... F02K 7/10
[52] U.S. Cl. .................................. 60/204; 60/270 R; 60/39.72 R
[58] Field of Search ............... 60/270 R, 39.71, 39.72, 60/39.74, 204

[56] References Cited

U.S. PATENT DOCUMENTS

| | | | |
|---|---|---|---|
| 1,273,466 | 7/1918 | Doble | 60/270 R |
| 2,692,480 | 10/1954 | Viaud et al. | 60/270 R |
| 2,937,501 | 5/1960 | Trousse | 60/270 R |
| 3,075,353 | 1/1963 | Mullaney et al. | 60/270 R |
| 3,455,108 | 7/1969 | Clare et al. | 60/39.72 R |
| 3,514,957 | 6/1070 | Evans | 60/270 R |
| 3,691,764 | 9/1972 | Ware | 60/39.74 R |
| 3,800,531 | 4/1974 | Sharpe | 60/269 |
| 3,841,090 | 10/1974 | Sharpe | 60/269 |

*Primary Examiner*—Robert E. Garrett
*Attorney, Agent, or Firm*—Siegmar Silber

[57] ABSTRACT

A combustion process derived from boundary layer stream containment and manipulation of all the combustion phases in auto-pro-progression, within a unitary-continuous sequence, in a supersonic and/or high subsonic velocity mainstream employs no auxiliary devices, systems, phases, streams or fuels and introduces novel means for generating and sustaining the process, using common fuels. It is applicable to stationary power and high thrust propulsion sources.

8 Claims, 22 Drawing Figures

COMBUSTION PROCESS

This invention relates to both subsonic and supersonic combustion and more specifically to methods and apparatuses to institute, sustain and wholly complete combustion of commonly utilized liquid, gaseous and exotic fuels, in a subsonic or supersonic airflow stream, in addition to the applications of the results of such combustion to particular devices.

Whereas the products of technological change have created air or gaseous flows at high subsonic or supersonic velocities as part of common operation for combustion-utilizing devices, in either internal and/or external media, institution, sustenance and completion of such combustion is to date ineffective and/or inefficiently attempted, so that a technically viable and economically feasible device—even using exotic fuels—has not yet been actually achieved.

Resolution of these problems has been to diminish flow stream velocities to that subsonic range found optimum for specific liquid fuels in wide usage. This necessitates the concomitant application of prevalent designs for devices, while conditions for operation change materially, so that mid-range subsonic combustion velocities serve to power devices functioning in high subsonic and well into high supersonic regimes. Even when high subsonic and supersonic stream flows have been used for combustion, devices designed for their use reduce all or part of the stream cross-section to a subsonic velocity for one or more of the combustion phases and commonly introduce separate coincident exotic fuels or oxidizers with contributory combustion and/or injection devices. There will be multiple flow streams at different velocities moving in the same direction and in which each stream acts independently to provide one of the combustion phases for the main stream. The mainstream retains its essentially basic physical properties and sectional structure until combustion is initiated.

When sectional structure is changed in any way, essential problems have resulted therefrom to alter one or more or all of the phases of combustion seriously enough to markedly decrease pressure recovery and jeopardize flame holding. That is, the present means in which fuel injection, mixing or flameholding is accomplished can basically disrupt stream flow laminae and create averse shock fronts, turbulence, sudden static pressure elevation, rapid temperature rise, wide non-isentropic areas and wave formations, devoid of control for location, distribution, directional propagation, or for that matter, desirability of these conditions.

Moreover, current combustion chamber design, being restricted by stream velocity and temperature, lacks the flexibility to function without forward diffusers that reduce stream velocity with their losses of drag, weight, size, translation complication, temperature rise, boundary layer drag, static pressure rise and density decreases at high altitude.

Some current designs use special gaseous fuels such as hydrogen, acetylene, preheated and pyrolyzed propane—at times in the mainstream flow, at other times in a multiple injection system of pilot flame propagation in addition to the main flow—as pre or coincident combustion. These sometimes include special auxiliary chambers with additional oxidizers for the pilot flame in order to assure an exterior source of flame holding, flame propagation consistency and combustion completion.

Exclusive ramjets and scramjets presently do use a single main flow stream, but are compelled to rely on constricting throat diffusers for stream velocity, reduction and compression, coupled with deliberate vortex-turbulence generators for flame holding and complicated fuel injectors in order to sustain combustion and avoid normal shock waves which accompany perpendicular fuel injection. In effect, present design is fragmented, consisting of an admixture of separate devices, each to satisfy a single phase, instead of an integrated, progressive combustion process. They overlook local area shock wave generation, cross-flow turbulence and flow stream chokes with potential stagnation loci. So much effort has been devoted to mixing, ignition, flame-holding and combustion completion—as independent functions—that a total system does not really exist despite the expedients of special fuels and oxidizers.

Therefore, an object of this invention is to provide a combustion chamber of an integrated, fundamental design:

It is another object of this invention to provide a combustion chamber of empirical simplicity.

It is another object of this invention to provide for the combustion of fuels from the subsonic to supersonic gas flow.

It is a further object of this invention to provide an exclusive, single, basic structure.

It is another object of this invention to provide a single combustion sequence.

It is still another object of this invention to provide combustion in one flow stream, with no auxiliary combustion stream or sources.

It is yet another object of this invention to provide for a fuel injection process of very low drag free of normal, oblique or "Y" shock waves, incorporation specific, but different devices for aspiration fuel injection.

It is another consequent object of this invention to use a modified nozzle device as a diffusic intake to satisfy parameters.

It is a further object of this invention to provide an intensely confined, dense, main stream—a multiple boundary layer to initiate ignition.

It is a further object of this invention to provide all the combustion phases within that main stream.

It is yet another object of this invention to use this specific process without the introduction of extensive stream vortex-turbulence generating devices for mixing, flame holding and combustion.

It is an object of this invention to utilize detonation ignition and extended combustion of the supersonic stream for precise control distribution, predictability and total completion.

It is further object of this invention to provide for the use of common liquid or gaseous fuels.

Briefly illustrated and described, this invention in one basic simple form relates to the combustion process that can be utilized by subsonic and supersonic stationary power and vehicular propulsion devices, such as gas turbine engines, ramjets, scramjets and their combinations.

It is another object of this invention to illustrate some specific devices using this invention, applied to means for mechanical work or gaseous columns as in gas turbine engines, ramjets and scramjets.

It is a concomitant object of this invention to illustrate a specific efficient device to generate the main stream where subsonic incident stream flow is encountered. This invention encompasses a combustion process based upon the following principles:

a. the incident stream intake is introduced via a modified Busemann-Prandtl nozzle as a diffuser.
b. the initial main stream is separated into multiple or a single peripheral stream consisting of a multiple thickness boundary layer.
c. the purpose for an initial boundary layer mainstream is to generate fluid shear, stresses and strains within it for specific use.
d. absolute, positive, parallel aspiration fuel injection of minimum drag is achieved.
e. utilization of the generated conditions in item b leads to immediate mixing coincidentally with the above method of fuel injection employed.
f. both fuel injection and mixing avoid normal, oblique or "Y" wave shock generation.
g. the fuel-leaden mainstream is separated into two or more, oblique streams, the reverse stream or streams generate and add heat to the downstream stream or streams, which are significantly cooled.
h. detonation ignition is part of auto-ignition resultant from an oblique shock wave or waves toward the upstream, emanating from the latter stream from item g.
i. the conditions of items g and h are created specifically by novel devices designed to generated both stream separation and oblique stream direction consisting of specifically-located oblique plane surfaces.
j. subsequent combination takes place in two phases:
—an upstream ignition-combustion stable area, a flameholding area.
—a downstream main combustion chamber past the oblique plane surface or surfaces; assuring complete combustion.
k. combustion is sustained and held by specifically-located oblique expansion, contraction, and reflector shock waves with heat transfer therefrom via specific stream movements and surfaces.
l. heat transfer to the chamber walls is low, confined essentially by a specific wave formation and boundary layer flow.
m. all of the combustion phases are stable and remain fixed within their design purposes and locations.

This invention will be better understood when studied in conjunction with the following description and schematic drawings in which.

The combustion process of this invention is founded on specifically-known principles and the fundamental research of investigators in the dynamics of compressible fluids. Air, or another compressible fluid under compression, is directed as a narrow jet stream—the effect of a double boundary layer—from its line of direction to undergo aspirated fuel absorption and mixing, and focussed upon an oblique surface to its direction. Thereupon, it divides into two streams; one of elevated temperature that reverses its flow-direction and the other of markedly decreased temperature than continues to flow obliquely but in the general direction of the original stream. An oblique shock wave will develop from the fast flowing cold stream surface, which is utilized in the design of this invention for the ignition source. Thereafter, by subsequently-controlled shock waves, initial boundary layer burning is carried downstream in a progressive flame front for supersonic combustion to completion over a long distance.

In all the combustion chamber applications but one, in the accompanying figures fuel is introduced into a boundary larger stream via aspiration from a surface upon entry into the system—either from a wedge surface or conduit wall.

This wedge surface is not a splitter of wedges or plates, but a full center body and fuel injector which functions to create specific boundary layer streams with the conduit walls as well as the source of fuel injection, and the device for fuel mixing. In addition, it serves the function of a flame holder and flame propagator.

My application of this form of fuel injection is derived from the empirical research of Markus Reiner and the work of Theodore von Kamman. It was the latter who established that air under high compression and velocity assumed the physical properties of an incompressible fluid. In research under two Air Force Research and Development Command contracts, Markus Reiner demonstrated that air under compression and specific velocity is elasto-viscous and exhibited incompressibility while also then possessing a determinate strain modulus. According to Reiner, if air is sheared, a tension and a pressure are created with attendant cross stresses. At laminar thickness boundary layer gaps, $7\mu$ to $15\mu$ a centripetal force is generated. Larger gaps create a centrifugal force between two solid limits.

I employ the above principles by introducing an incident air stream of high velocity, and under compression, to a wedge center body whose outer walls are porous and whose surface is provided with a layer of fuel pumped from within the wedge body. With a gap between the wedge surface and chamber wall slightly greater than $15\mu$, two actions take place. First a centrifugal force will be generated in which three streams will be extant—two boundary layers, one for each surface and a central stream where, because of the force in effect, will cause stream movement toward the center, and fuel with the boundary layers will move toward the central stream. While this causes full mixing, it also thickens the central stream, with shearing resulting with the two boundary layers. These stresses set up strains in the boundary layers in the direction of central stream flow, which draw fuel further into the central stream and also obviate boundary layer parasitic friction with the respective surfaces. Boundary layer flow velocity will further diminish, if at all, but it will thicken and present an area downstream of the wedge surface where the stream gap will be less than $15\mu$ and a centripetal force generated. This will result in a strongly-coalesced central stream—narrow, well-mixed with fuel and contracting away from its confining walls when reaching the wedge trailing edge where the central stream leaves the wedge surface downstream.

That stream is intercepted downstream by an oblique surface to its direction of flow and will separate on that surface into two flows—one in the direction of flow which will lose heat, and a second flow in reverse to its original direction of flow on that surface, which will gain heat. A known principle is here demonstrated in which an initial flow under compression and at specific velocities, directed to strike an oblique surface to its flow direction, will separate into two flows, as illustrated in the foregoing with its concommitant results. Raising the p.s.i. and/or velocity of the original stream results in geometric temperature differentials and increased subsequent separated stream velocities. In fact, in a paper by Rubins and Rhodes, they reported in their research that showed that a stream flow directed against oblique surfaces—as mentioned before—if of high velocity, will develop oblique shock waves emanating from the separated stream flows—essentially from the faster approximate original flow direction stream.

In another paper by Antonio Ferri, it was pointed out that mass flow depends on the dynamic pressure of the jet stream, consequently both the original stream and subsequent separate streams, under compression and at high velocity, represent high mass fuel mixing and fuel transfer efficiency. Where mixing results in some large fuel concentrations within the stream, Ferri emphasized that there is little effect or loss in supersonic combustion efficiency. Ferri amplified this in stating that mixtures of large density differences create very fast mixing. Both of these factors augur to provide very high fuel absorption and mass transfer, as well as mixing within the boundary and central stream layers.

Any previous type of fuel injection would make the combustion system of this invention impossible. As is known, perpendicular injection of fuel into a supersonic stream causes a normal shock wave to develop at that point, which should be avoided. Devices to approximate parallel fuel injection—as inclined injection—result in two series of deleterious shock waves, according to Ferri. A local pressure area builds upstream of the injector with a resultant oblique shock wave and two shock waves behind the first, emanating from the forward compressed area and upstream lip. Another shock wave results downstream where there is reattachment to the wall. Flow reversal occurs both forward and aft of the injector and temperatures elevate at the point of reattachment—highly undesirable. This is confirmed by a reported paper at the Second International Symposium on Air Breathing Machines, Mar. 1974.

Though Ferri used gases and stated that incomplete mixing had little effect on supersonic combustion, it would indicate the same for my use of a dense liquid with a dense gas, and hence mixing in my design will be complete. Nevertheless, a form of parallel injection was tried and reported at the same Symposium mentioned above. A drop-step downstream was employed with a deep cut-off step coincidentally with the former for flameholding. Two oblique shock waves emanated from the first step trailing edge lip with ensuing mixing. Strong eddy formation was generated behind the second step drop, with pronounced boundary layer stream reversal for presumptive further mixing and heating. However, flame propagation with combustion is assigned an amorphous zone downstream of the recirculated flow, peripheral to and in diameter outside of the main stream mass flow, with no indication of control or predictability over the combustion area, flame propagation, heat transfer or affect on the inner mainstream.

With a developed fuel-laden high velocity and compressed double boundary layer passing the trailing edges of the center body wedge, this stream is directed against one or two deflector-separation plates or body surfaces obliquely to the stream. Separation as previously described takes place with the reverse flow stream moving outward toward the conduit walls and reengaging the original central stream upstream. Its effect is to release heat to the fast central stream plus the addition of volume with some slowing of that stream as it strikes the oblique surface for flow separation.

The second flow maintains its velocity with little loss, and though it loses much heat to the oblique surface and the area downstream of the wedge center body, this process is modified by its absorbed heat from the reverse flow stream. Rather than a cold area behind the wedge, there is one of a temperature drop that is between the raised temperature of the first separated stream and the potential drop in temperature of the second separated stream.

Two developments take place with respect to the fast stream and its location. Firstly, if two oblique body surfaces are used, an oblique shock wave emanates from the fast stream moving upstream at an angle where it is intercepted by a corresponding oblique shock wave from the opposite oblique angled surface. There will be heat generated and auto ignition in this fuel-laden stream area, as illustrated by Rubins and Rhodes in demonstrating that an oblique shock wave encourages auto-ignition and combustion. In fact, according to Ferri, intense mixing as well as ignition is encouraged by shock waves, the obvious result of their concentrated density, doubly so if two shock waves are crossed, as described. In some wedge designs of this invention, another center free stream may be admitted through the wedge center to carry combustion down stream past the oblique planes, with added cool air volume for cooling the flame front which obviates or delays any chemical dissociation downstream, and acts as a volume augmentor in completing combustion.

This central slot, where it occurs, is the divergent end of a diffuser-nozzle design of this invention. When the incident stream reaches the wedges' center body, when used, it is separated into effective thick boundary layers around the wedge in the form of a light, compressed shock envelope. When there is a central slot-hole in the wedge, the modified Busemann-Prandtl nozzle is utilized. Whereas two reflective shocks may occur in the conduit downstream, they will be dissipated and emerge as a slower, compressed—but expanding—stream into the chamber behind the wedge body. No fuel is mixed in the central conduit with this center stream.

In all systems of this invention, with or without forward center bodies, thrust planes or deflector body surfaces, ultimate combustion and expansion occurs in a main chamber downstream of the mixing-ignition pre-combustion chamber, though each system varies in kind and degree.

Many variations of the system have ejector-augmentor provisions at the termination of combustion both for volumetric addition and cooling. Those that contain incidence separation of the mainstream may exhibit a double wedge ring for an annular combustor, or a double or a single, oblong, square, oval or cone wedge for a canister chamber, ramjet or scramjet, or their combinations. I have also an illustrated double diffuser for this region with special purposes and properties for one of the devices at this station. In general terms, the preferred embodiment of this invention is a combustion process wherein:
 a. all phases follow a continuous and progressive sequence in a unitary continuum.
 b. there are no auxiliary or secondary systems or phases, or phases devised from secondary systems.
 c. all phases of the unitary combustion process and function wholly within the sequence.
 d. the operating medium is a single, compressed supersonic airstream.
 e. all phases of this unitary combustion process are the result of specific modification of the operational mainstream.
 f. this combustion process is devoid of any oxidizer or other additive besides the fuel initially mixed with the mainstream.
 g. the system is devoid of chokes, and any impedance to stream flow is immediately translated into a form of energy transfer.
 h. the system is one of empirical simplicity.
 i. the system is self-sustaining.
 j. the system is self-actuating.
 k. all stream flows contribute to and are part of the unitary combustion process.
 l. the phases are unaffected by initial stream compression ratio and/or velocity variation with respect to phase location, function or relative value to each other.

Following are descriptions of each of the accompanying figures.

Figure 1:
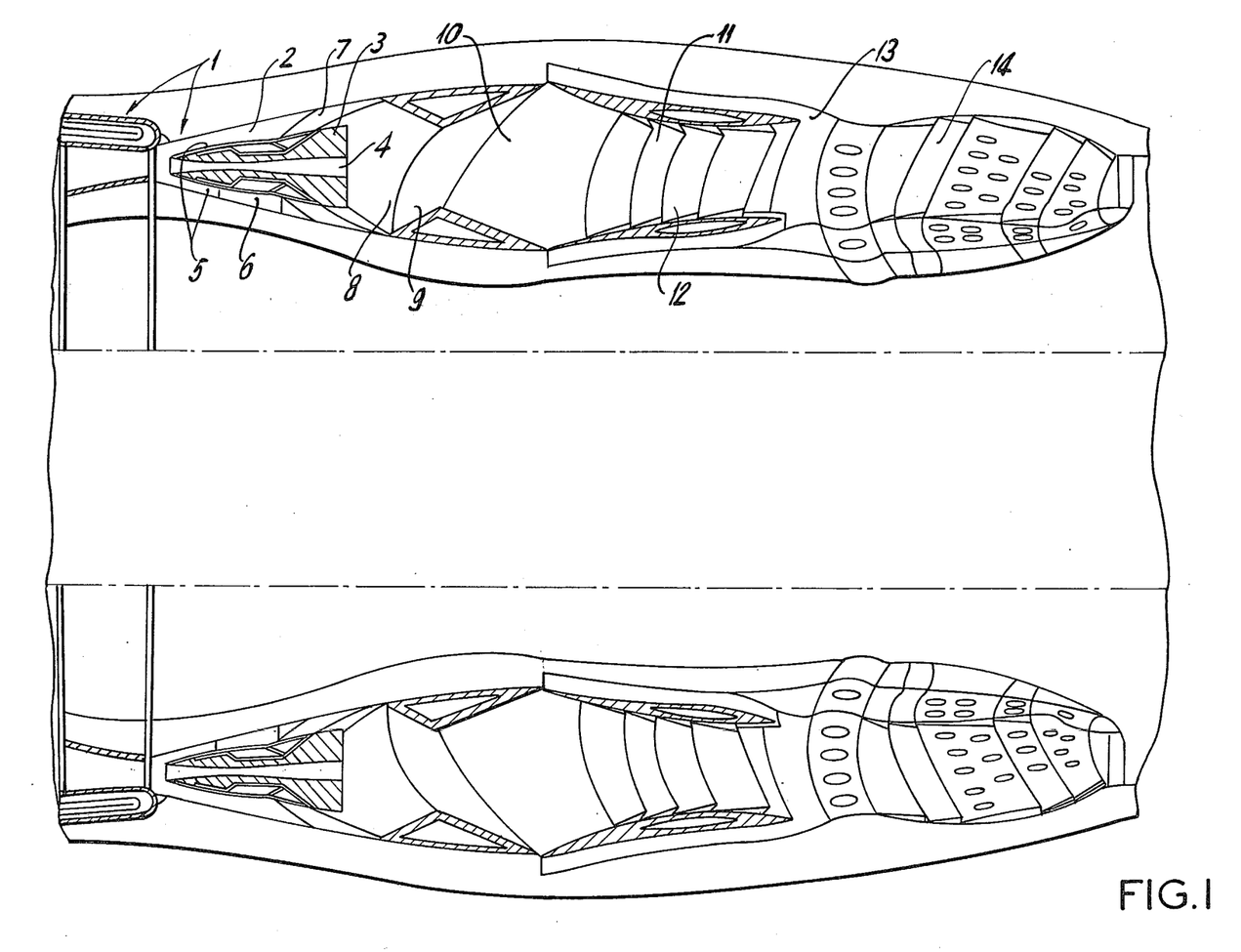
FIG. 1 is a longitudinal section of one form of the basic combustion chamber for an annular application for a gas turbine engine.
Figure 2:
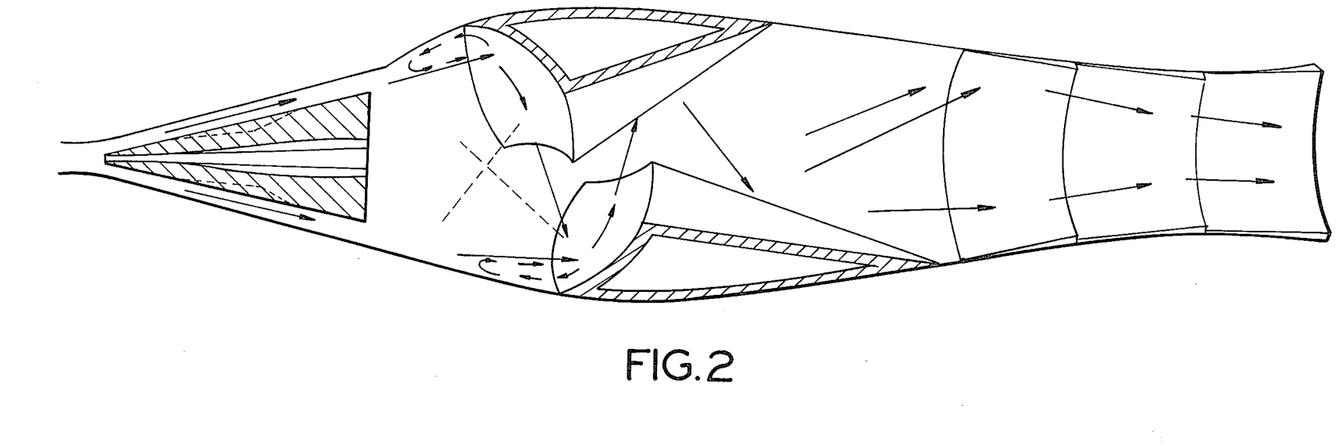
FIG. 2 is a longitudinal section of a separate combustion chamber of this invention with a double wedge center body and double flow separation bodies as for FIG. 1 with their stream flow patters but applicable to an annular or canister chamber.

In FIG. 1, with flow patterns in FIG. 2, air under compression and high velocity is admitted from a diffuser, a Busemann-Prandtl nozzle combination 1, to the pre-chamber, 2, where it encounters a double wedge annular ring 3.

Whereas an entry conduit would be a diffuser that diminishes velocity considerably, parameters here require maintaining velocity and compression. Since the stream compression from the compressor is high, as well as velocity, any open throat converging diffuser will generate an upstream bow wave and a possible normal shock wave at the point of convergence. Even if the converging area is gradual and elongated, a normal shock wave can occur at the diverging point.

To avoid the bow wave and both shock waves, this invention incorporates a straight-sided entry conduit, which shortly ends in a slight convergence and ensuing Busemann-Prandtl nozzle for its exits. In this way, any developing normal shock at the convergence is carried downstream into the nozzle and into the oblique shock wave, self-cancelling system of the nozzle. Thus, upstream static pressure will not develop to create a bow wave and exit exhaust—flow stream—will retain its velocity and essential initial compression.

The air stream is separated at the wedge entrance into three streams, one on eitherside of the ascending angles of the wedge, and through a central slot 4. The two other streams are very narrow, just above $15\mu$ in thickness, while the central stream is expanded by divergence of the walls down stream to the wedge's trailing surface.

Thus two outer streams, thick double boundary layers, absorb fuel from their respective wedge surfaces 5, which exhibit a cut in their face 6, providing a downstream and upstream lip, the former slightly more elevated than the latter. The stream boundary layer moves into the cut, picking up fuel, and reverses its flow. As it does so, it is caught by the stream flow and removed downstream past the lower-aft lip. Any heat is also transferred downstream with the boundary layer flow. This process is known but applied in the demonstration of 100% heat transfer from an aerodynamically-heated surface, though with an added gas volume in the "trough" between the leading and trailing lips. Since the airstream is under compression, any reverse flow will add static pressure in the trough and effect a compressed volume that is equivalent in effect—movement—to added volume at low pressure.

All wedge center bodies are supported by streamlined swept struts 7, with their thickest chord 55% downstream from the leading surface.

Both streams impinge upon the downstream oblique shock surface bodies 8 and 9, the inner body being offset downstream in relation to the outer oblique surface body. Both bodies occupy slightly more than ⅓ of the chamber volume in prescribed partial upper-lower (inner-outer) hemispheres leaving a central open area, as a staggered slot.

Each peripheral stream separates into two streams, one moving away from the center toward the outer wall and a second stream moving toward the central open area, the former slower and hot, the latter fast and cold. The hot stream reaches the wall, turns upstream shortly, but in coming in contact with the mainstream moving downstream, is absorbed and adds volume and heat. From the cold stream, modified by heat from the recirculated stream, an oblique shock wave is generated that will be felt upstream. Given two similar streams and their shock waves, a combined mixing-flame holding area is created where the two shock waves cross, which should be behind the wedge trailing surface and in line with the central stream flow. Since static pressure prevents flow upstream, the central stream moves the combined flows downstream.

Ignition occurs at the incidence of shock wave generation, as that the two ignition areas are coalesced into a combined ignition-flame holding and flame propagation continuous sequence.

Because of the staggered locations of the oblique surface bodies, outer body flow is directed against the inner body surface, amplifying its original stream and shock wave intensity and becomes the source for flow direction into the main combustion chamber.

Both oblique surface bodies are followed on their downstream side by trailing reflective surfaces 11 and 12. Major combustion takes place here as the burning streams are reflected and slowed by secondary oblique shock waves within a short-total distance, but many times longer than that described for supersonic combustion previously.

Combustion products pass a slight diffuser constriction and wall turbulence by wedges and with it cool air augmentation 13, before moving into a farther augmenting flame tube 14, to turbine blades.

Figure 9:
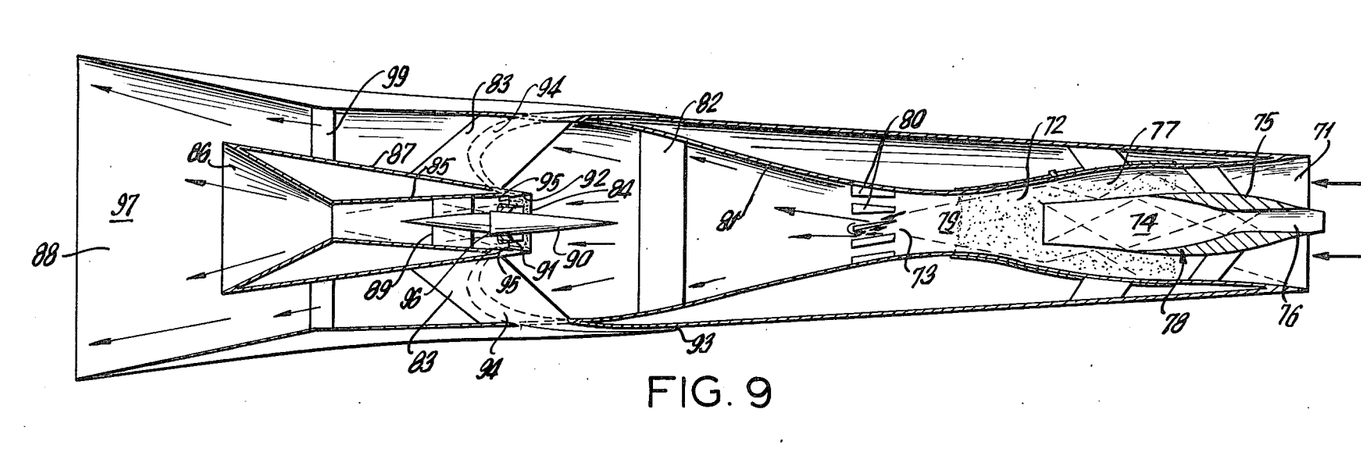
FIG. 9 is a longitudinal section of a ram-scram jet combined engine (though each can operate separately), utilizing the principles of this invention with their stream flow patterns.

FIG. 9 is that of a single chamber or canister if used in multiples, of the principles in application in FIG. 1. FIG. 2 excludes any augmentation or flame tube which can be eliminated for ramjet burner application or as a self-contained propulsion jet. Two points vary further from FIG. 1. The first is that the option of a wedge cut for fuel absorption is illustrated with its alteration of a smooth surface, which under the circumstances described earlier, will suffice as well. The second refers to the extended wall surface for the peripheral hot air stream, which, because of its conical configuration, controls and directs recirculation more positively to the mainstream.

Figure 3:
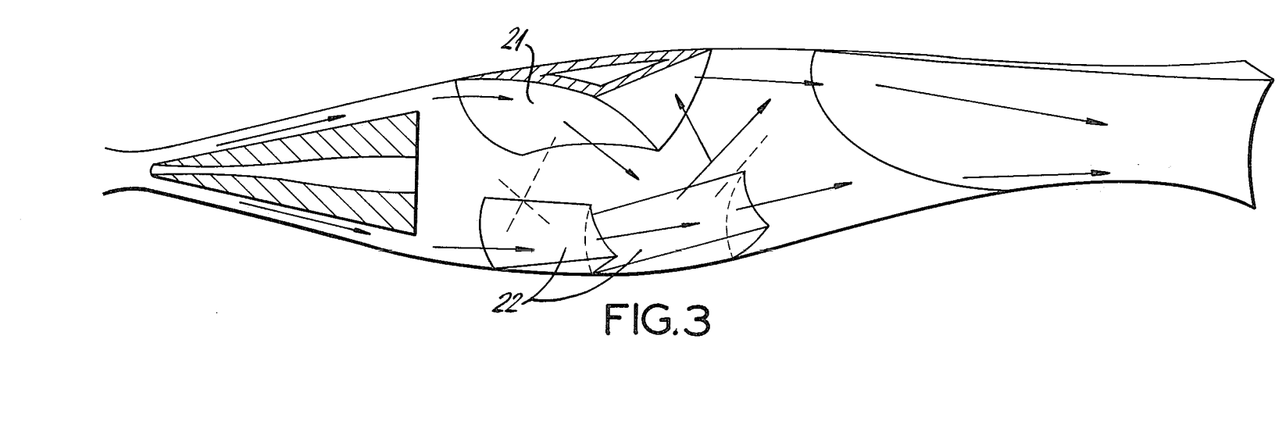
FIG. 3 is a longitudinal section of a separate combustion chamber of this invention with a double wedge center body and a single flow separation body with their stream flow patterns applicable also to annular form.

FIG. 3 is a single chamber for canister burner or individual, self-contained unitary propulsion device. Flow separation is initially the same as for FIGS. 1 and 2 until the flows pass the double wedge. One deflector-oblique surface body exists 21, with the same flow patterns. Lower or inner surface stream flow passes through the oblique shock wave of the outer body and ignition is initiated in this stream moving downstream. While it is a narrow stream, its combustion and flame holding qualities continue as it moves over a series of wedge vortex generators at the walls 22, which is where this stream is confined, though it receives added volume and heat from the deflected opposite mainstream.

Midway in the mainstream, considerable turbulence, heat generation and combustion take place as a cumulative result with the stratum of the inner stream—away from the boundary layer,—moving quickly downstream. However, the wall for the inner-lower stream makes a fairly abrupt turn toward the center, assuring combustion completion for all layers and adding a confining effect for stream coalescence before augmentation or exitting.

Figure 4:
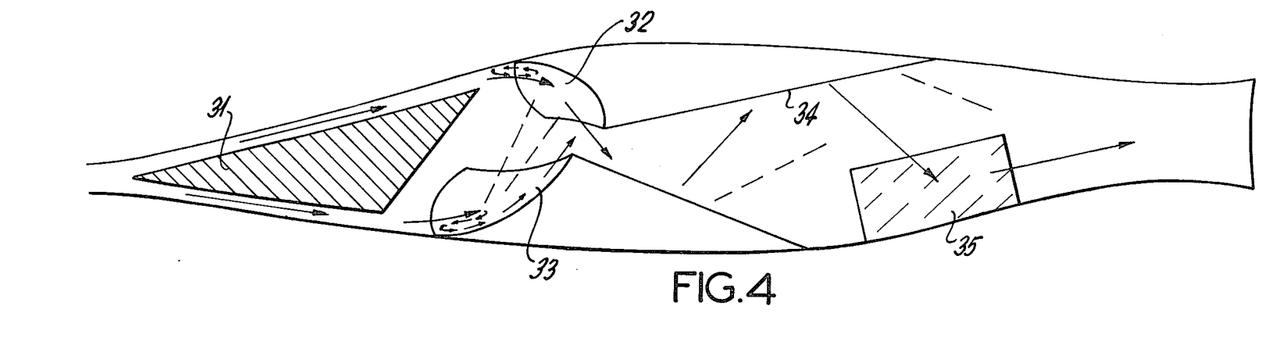
FIG. 4 is a longitudinal section of a separate combustion chamber of this invention with a single wedge center body and double separation bodies with their stream flow patterns applicable also to annular form.

FIG. 4 illustrates a single wedge center body 31, with a receding inner-lower surface and two deflector-oblique surface bodies 32 and 33. Initial stream flow is divided into two peripheral streams only, there being no center body hole-slot. Outer-upper stream flow proceeds as in FIGS. 1, 2 and 3 and rests at the deflector body as previously. A lower-inner stream, though also fuel-laden, leaves the wedge surface quickly, where because of stream dispersal at its outer strata and expansion aft of the wedge, gives rise to some eddy formation immediately aft of the wedge body. A strong oblique shock wave develops from the upper deflector body and it intersects a weaker shock wave from the downstream staggered, lower deflector body. Consequently, though ignition and combustion and flame-holding is instituted behind the wedge, it is the lower stream that carries stream movement downstream, albeit-slower than in the previous figures, and encourages combustion to continue from upstream to downstream into the main chamber in a longer time sequence. There, reflection-expansion waves from the inner-lower oblique body to the following plane 34, downstream of the upper-outer oblique body and back to the after-following plane of the inner body 35, with oblique shock waves from both surfaces sustaining flame-holding and combustion.

Figure 5:
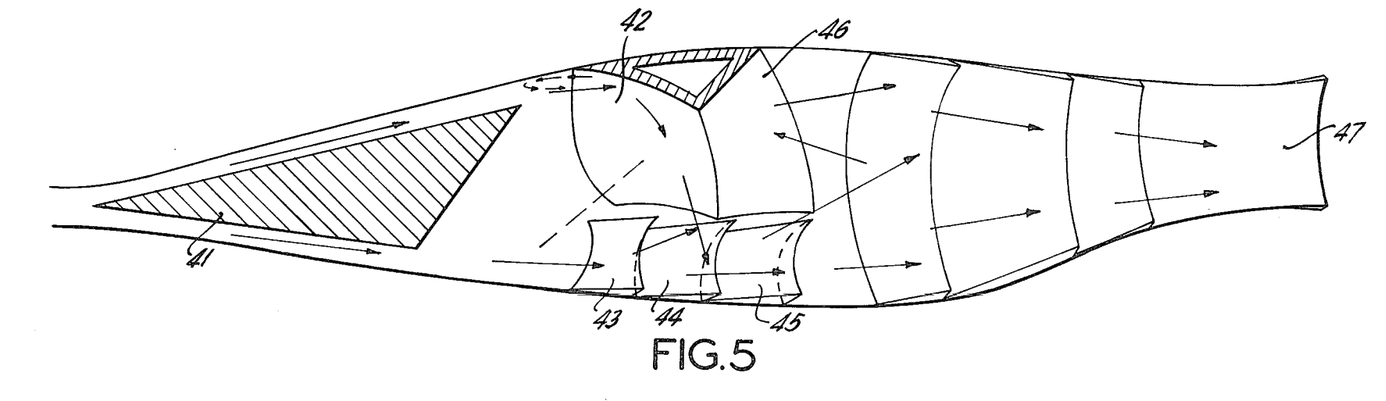
FIG. 5 is a longitudinal section of a separate combustion chamber of this invention with a single wedge center body and a single separation body with their stream flow patterns—applicable also to annular form.
Figure 6A:
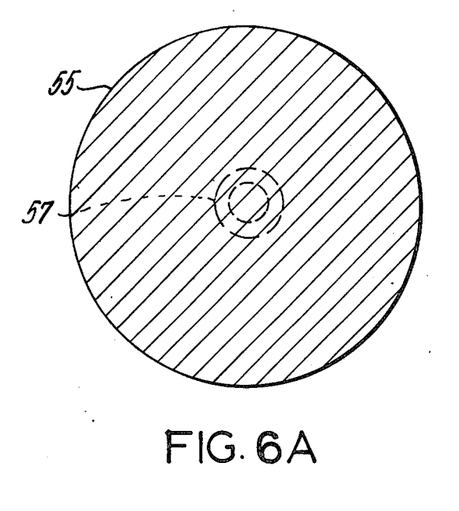
FIGS. 6A–F illustrate the double and single wedge center bodies in cross-section from the trailing surface facing upstream.
Figure 6B:
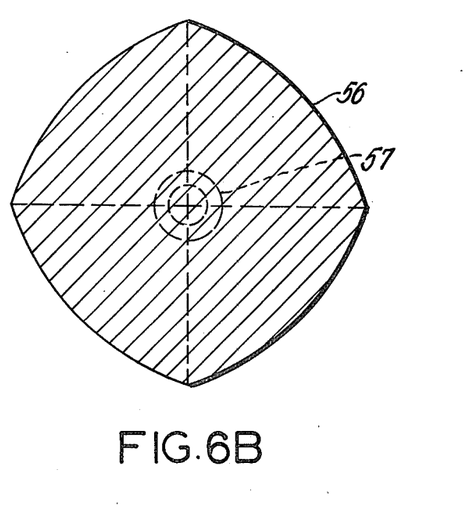
Figure 6C:
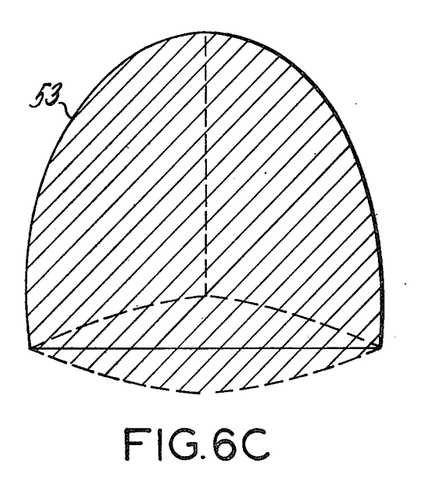
Figure 6D:
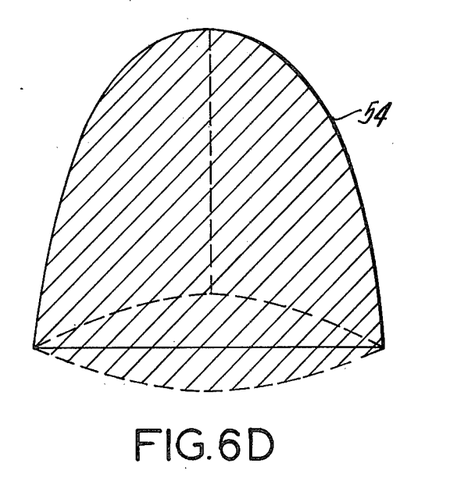
Figure 6E:
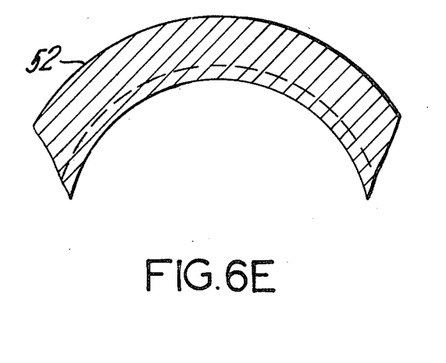
Figure 6F:
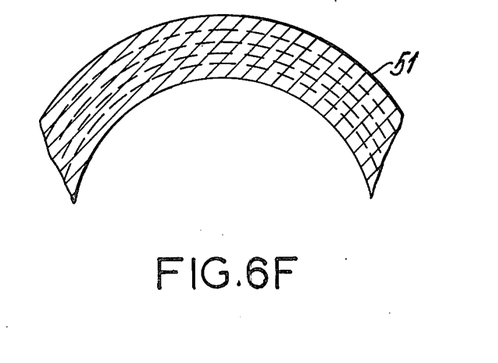

FIG. 5 includes a single center body wedge 41, with a single deflector oblique surface body 42. Initial airflow is divided as in FIG. 4 with flow stream patterns of the upper-outer stream as in all previous figures. Lower-inner stream flow follows the pattern of its respective flow in FIG. 4. There being no lower-inner deflector body, the stream in this region strikes three deep, following wedge hemi-plates, 43 and 44, and 45, that are exaggerated wedge ridges. In this case, the single deflector body 42, is enlarged and covers approximately 55% of the chamber cross-section, and this will then concentrate flow to the wedges with two weak oblique shock waves resultant. Flow direction is toward the downstream and a shock front to the opposite wall, reflected to the wedges. This reflective shock front returns to the wedge side downstream and strikes a slightly angled plate 46, toward the center. Thus, the stream flow and shock front coalesce at the exhaust convergence 47.

FIG. 6 consists of six diagrams, each at the wedge trailing-aft surfaces; FIG. 6E for the double wedge ammular ring 52, FIG. 6C for the single wedge unit for a single combustor 53 with a flat or curved lower surface and wide sides, FIG. 6D, another with bi-flow curved sides, and FIG. 6B, a shallow curved diamond combination wedge 56. The optional center conduit is illustrated in FIG. 6A at 51.

Figure 7A:
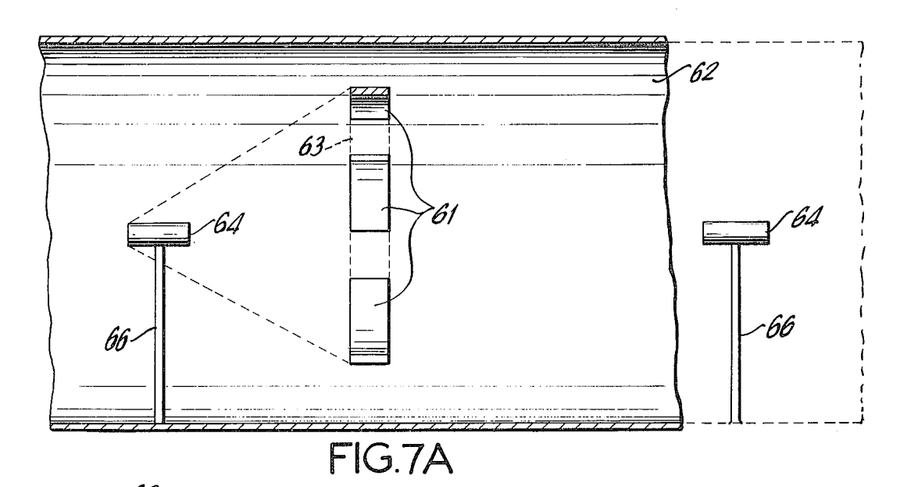
FIGS. 7A and B show longitudinal distribution patterns for plurality of units of the combustion chamber in a flow stream.

FIG. 7 includes any type of unit combustor from FIGS. 2, 3, 4, or 5 in multiples; A in which combustors 61, are distributed annularly through the stream conduit 62, which provides exhaust products and burning downstream with an avoidance of wall interference.

Figure 8A:
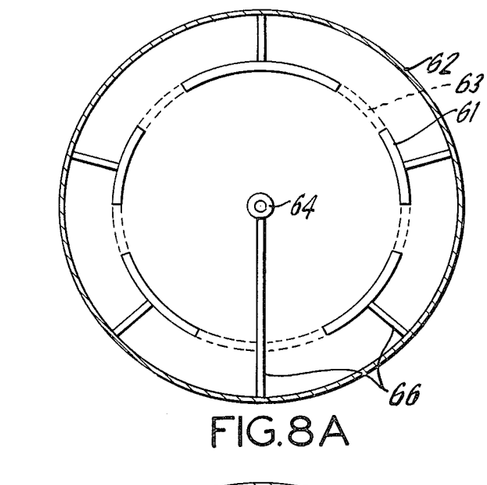
FIGS. 8A and B show cross-sectional views of FIG. 7.

In FIG. 7A, each of these peripheral annular burners is an arc-sector configuration 63, in FIG. 8 which are subject to the descriptions for FIG. 1. Actually, if maximum thrust is desired, an annular combustor for the full diameter, as in FIG. 1, is advised. For whichever annular combustor is used, a single circular configuration combustor 64, is located in the axial center downstream or upstream, so that a frusto-conical cone conical concentric flame front is produced downstream toward the exhaust convergence 65.

Figure 7B:
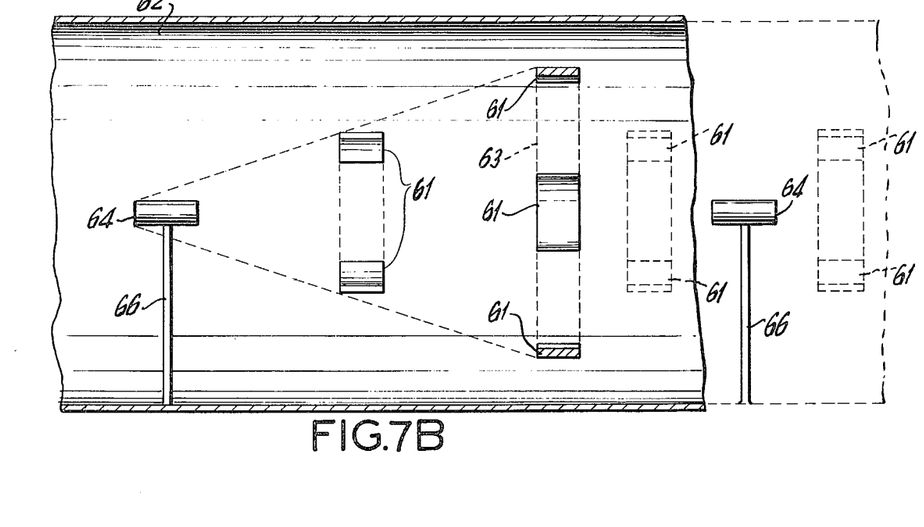

In FIG. 7B, the annular combustors of the same arc-sector 63, are distributed so that each arc-sector alternates with its preceding and succeeding sector in being located closer or further from the axial center. Thus, two annular rings 66 and 67, are created, the inner one closer to the center, with gaps for the sectors of the outer ring. Centrally, the singler circular combustor 64, occupies its same positions as of above.

All members are supported by struts 65, from the outer wall where turbulence generated there aids mixing, combustion and boundary layer movement.

Figure 8B:
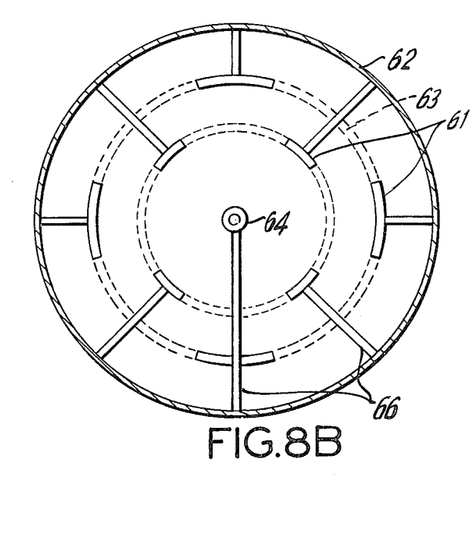

FIG. 8 shows the cross-sectional distribution of combustors in the conduit 62, for FIG. 8A and FIG. 8B. Annular combustors 61, are illustrated separated with dotted lines for the alternate full circle configuration. The central circular burner 64, as well as the annular combustor 63, 64, and 65, are supported by struts 65, with the same aerodynamic chord configuration as those in all previous figures.

FIG. 9 illustrates another application of this invention—a ram—scramjet. Air at high velocity enters the throat of the ramjet via two sources, a large fructo-cone mouth (a Busemann-Prandtl, diffuser-nozzle combination) of the outer conduit 71, whose inner surface 72, tapers to a downstream throat 73. In its center, a double diffuser center body 74, presents an outer surface 75, of compensatory curvature to the conduit wall 72, with a central circular opening 76, to admit air directed to the throat at 73. And all surface curvatures are shallow, compression and velocity decrease is low and no normal shock wave develops—in either passage. The peripheral passage provides air volume, and from the porous walls of the outer conduit 77, fuel is added to the narrow stream as in the aspiration method described for the previous figures. This is compressed and mixed by the oblique shock waves generated by and reflected from the inner walls of the conduit 72, and center body outer wall 75, both conduits which are modified Busemann-Prandtl nozzles. Air pressing through the central passage 78, though of low compression, creates two series of long oblique shock waves, reflecting within the tube, but which exists as a compressed, fast stream on divergence, providing volume and static pressure at the inner throat face 79.

In previous designs, either an open cone with flat, tapered walls in a flat outer-walled conduit or a tubular conduit with a double convex-walled straight-inner through-hole, suspended in a straight-wall conduit, have been proposed. In the former, all reaction takes place within the open conduit walls that will generate a strong normal shock wave at the downstream aperture, as a potential choke, and a bow wave at the cone leading edge, hence a second, wide normal shock wave.

In the latter, the convex through tube creates a high compression tube with a known bow wave and a normal shock wave at convergence. Since the patent designs extant signify an accentuated and equal convergence-divergence diffuser, the work of Ferri indicates a second normal shock wave at divergence as well. No reaction of the outer tube walls with the conduit is indicated, but the tube, located within the conduit, will generate oblique shock waves with a potential choke downstream.

The parameters of this invention require a high velocity stream with a low additional static pressure. A double Busemann-Prandtl nozzle is utilized as a diffuser for the above, both for the outer conduit and center body tube. In cross-section, the outer conduit consists of its own inner walls and the outer walls of a center body, describing the nozzle. The center body through-tube also describes such a nozzle for its cross-section, thus it is one nozzle within the other.

A center body here is necessary, with its leading edge forward of the conduit, for it creates an oblique shock wave from its leading edge, usually a cone tip, but here a circular ring. That wave, directed against the conduit inner walls or leading edge, and by reflection, can be controlled for compression and velocity with a weak normal shock wave, or more, depending on the waves generated.

In this invention, shock wave reaction is double, from the center body outer walls to the conduit walls and from the center body inner walls upon their opposite walls. Both conduits exhibit Busemann-Prandtl nozzles and hence not true diffusers. Reflective, self-cancelling oblique shock waves generate no normal shock wave so that losses are minimal.

The two streams converge at the inner throat 79, the inner as a downstream force-stream and strike oblique plane plates 80, which are wedge shaped plates within the throat entry. As in previous figures, stream deflection takes places with the separation of flow into slow-hot reverse streams and fast forward-angled cold streams. Since these are plates and not bodies there are no following after-planes and flow patterns will differ. A series of oblique shock waves develop from the separated cold streams into a downstream shock front. Ignition thus develops into a stable shock flame holder-flame propagator. Eddy formation at both the leading and trailing edge reattack below each plate with stable ignition and burning there. However, expansion waves from the following oblique shock wave of the following deflector plate carry the combustion process downstream to the shock front, as well as some of the high velocity stream from the diffuser's central tube. Thus, both combustion and heat transfer readily move downstream.

The walls of the combustion chamber 81, at this station, expand with the generation of combustion products downstream. At maximum expansion, an annular slot in the wall 82, absorbs the slowing boundary layer and thus permits the exhaust to recool downstream unimpeded by boundary layer drag and vortices.

Immediately beyond the slot, a scramjet is suspended by struts 83—as a center body—with the same chord section for struts for the forward diffuser and those struts used in the other figures.

Receiving its initial stream from the ramjets' exhaust center, the scramjet varies from other applications of this invention. Consisting of a converging entrance conduit 84, with straight inner walls 85, it diverges downstream very sharply with its exhaust products minus any center body, into a wide ball housing 86. Its outer walls 87, are the inner walls of the combined ram-scramjet exhaust conduit 85. In the scramjet upstream center, struts of the above chord 89, support a long forward circular center body cone 90, and wedge ring 91. Ram exhaust encounters the cone and creates a shock wave that impinges on the inner lip of the scramjet's inner wall 92, where aspirated fresh air is mixed with the incoming stream. This air is derived from a boundary layer intake of the ramjet exterior wall 93, through conduits 94, in the main support struts. This lip area ends in an enlargement step of the wall, where fuel is injected 95. Mixing is by vortice and an oblique shock wave here, which is intercepted by the shock waves from the suspended ridge ring 91, between the center body and the outer wall. Further downstream, a circular cut in the center body 96, acts as a fuel-injector source with its shock wave and vortices. The shock waves from the forward lip cross the double shock waves of the wedge and are crossed by the center body shock waves downstream, affording excellent mixing, detonation ignition and rapid burning extension into the combined ram-scram exhaust 97. Those elements of my invention include the aspiration of the air oxidized with the fuel within the stream, as described in principle before, with boundary layer and shock wave mixing ignition, flame holding and combustion.

This combined exhaust is both cooled and augmented via the boundary layer volume previously absorbed upstream from the ramjet and now reentered via a slot 99, in the other wall. Here its functions are to diminish boundary layer adherence and to add volume and a peripheral stratum for total exhaust confinement, as an air column ejector, for additional thrust.

Ferri suggested a full compression center body, with the usual 20%-80% internal-external compression presumed, with a supersonic entrance stream. Fuel injection in his system came from two sources, a step downstream of the outer wall forward lip and another from a step on the center body just past its maximum diameter. He also interposed a suspended wedge between the two for shock wave generation. Though he presumed that supersonic combustion took place immediately downstream of the mixing—detonation ignition area of the crossing shock waves and fuel streams, such situation is seriously open to doubt. Between 20% to 40% ideal compression externally considerably diminishes stream velocity so that combustion is more likely to be subsonic even if mixing and ignition are not. Internal compression, as Ferri illustrated it, will assure subsonic combustion.

The center body of this scramjet provides no compression and acts only to create a shallow entrance cone shock wave that will be intercepted by the wedge and two diverging shock waves developed for fuel mixing and ignition. The entrance stream continues past these shock waves toward the walls to add volume to the flame front downstream of the flameholding system of the wedge and fuel injectors, as well as being a stream of lower temperature than the exhaust products. In addition, this invention utilized an aspirated additional fresh air stream as a medium to assure an adequate oxidized quantity for ignition and combustion within the flame structure, though burning here, as in the previous figures, stems from boundary stream mixing, ignition and initial combustion.

Ferri's suggestion makes it essential that all streams are supersonic as well as the combustion process. The design of this invention provides those conditions while Ferri's system does not. Ferri does emphasize that when such a system exists, mixing is highly efficient, extended, and combustion is complete, avoiding the choke and velocity disruptions of any normal shock wave, while the whole process remains in the supersonic and thus eliminating forward diffusion, diffuser geometry and/or translation with the absorbed anachronism of subsonic combustion for any application to a supersonic exhaust column.

Figure 10:
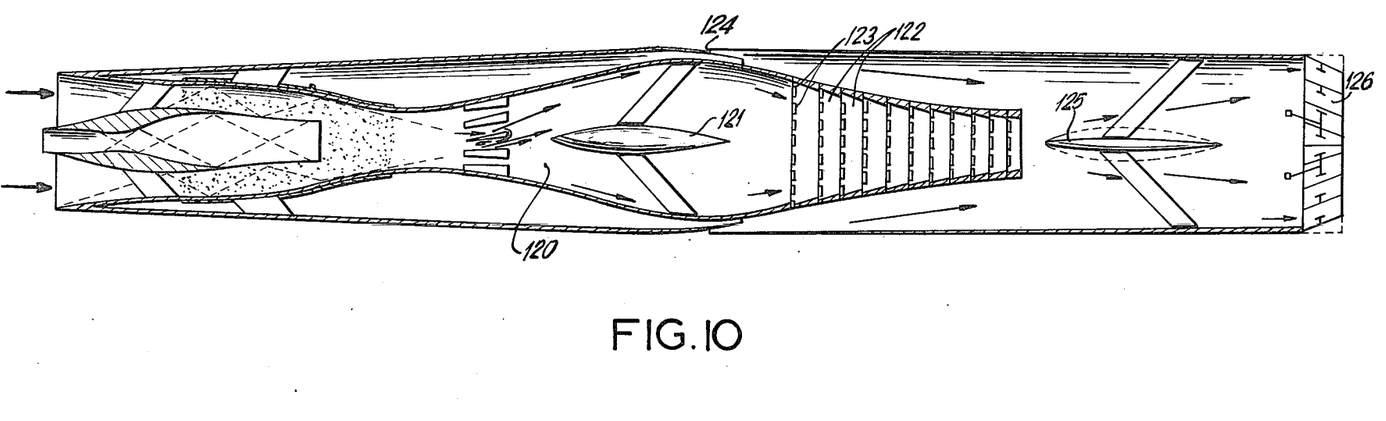
FIG. 10 is a longitudinal section of a ramjet engine utilizing the principles of this invention, with the attendant stream flows.

FIG. 10 is the completed ramjet phase of FIG. 9, but as a separate unitary ramjet engine. This engine is changed past the stream flow deflector plates where the resultant stream empties into a large diffuser 120, toward of which an expanding center body 121, creates a shock cone which proceeds into the diffuer convergence, where annular wedge-ridges 122, generate a turbulent boundary layer to which is added cooling air volumes via slot openings 123, in the wedges. This latter process aids both mixing and combustion completion as well as flow movement downstream as it exits into an expanding divergence augmented by exterior air from the annular intake 124. There is an exhaust nozzle modified to accelerate the stream volume by a second expanding center body 125, and variable geometry trailing edge petals 126, for accomodation of various velocity regimes, especially if the engine is to be used for long distance cruising and repeated operation.

Figure 11:
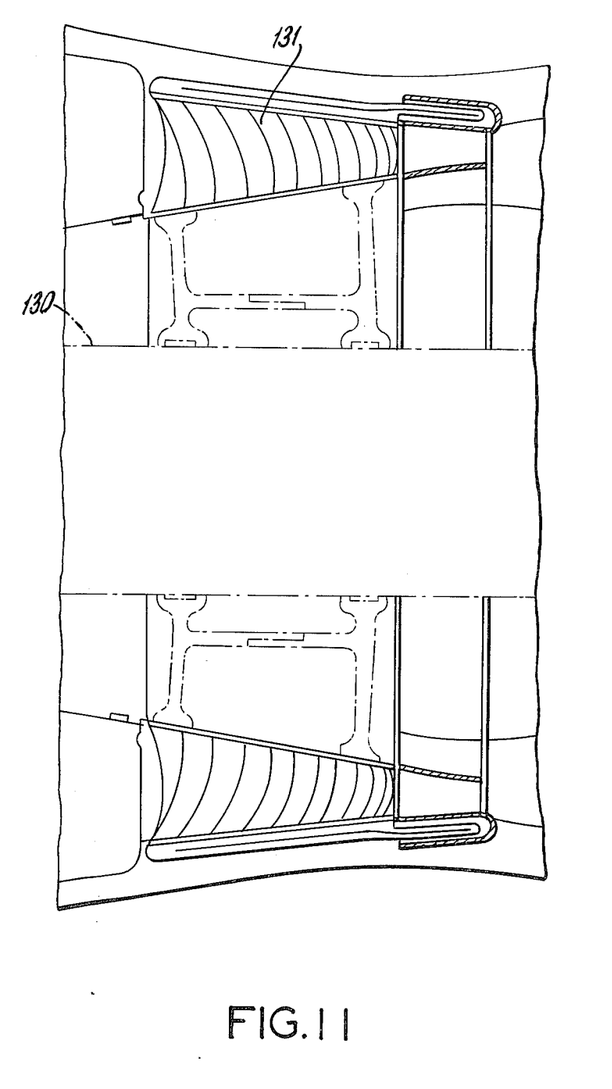
FIGS. 11, 11A, and 11B illustrate longitudinal section of a new axial flow continuous type compressor specifically for the gas turbine and ramjet applications of this invention.

FIG. 11 illustrates a new type of compressor that is mandatory for this invention, where the external intake stream is subsonic. Since this invention requires an initial stream of high velocity and compression, present designs of two or three spool multi-stage annular compressors or mixed annular-centrifugal compressors will not produce these parameters within limited dimensions, low weight and high volumetric efficiency.

This invention includes a new compressor to meet all those parameters mentioned. It is a mixed compressor with an annular compressor forward for high volumetric intake, coupled to a following multiple axial flow continuous blade type compressor on the same shaft 130, of such design to provide the high compression and velocity within economic and physical efficiencies.

An annular compressor will deliver a high volume but requires considerable length and size to add compression with limits, before a potential front in the form of a choke. Centrifugal compressors deliver volume but little effective compression of given volumes. Any bladed compressor, especially the annular type, encounters blade, stream and rotational problems. Long blades, to deliver high volumes and velocities, create compressibility burble and shock waves at their periphery and outboard sections, while rotating at subsonic velocities inboard. Ferri noted this in his studies on supersonic compressors. They also generate trailing edge stream vorticity at high rotational speeds, with consequent boundary layer separation and local shock wave losses.

Short, wide blades resembling marine screws have been proposed, even if they were to be designed as high speed marine screws with wedge cross-sections and cleaver-wedge configurations. Nevertheless, they do encounter cavitation; but here it takes the form of flow separation, flow reversal, after-wake drag downwash drag and areas of static pressure with reverse flow stream whorls which can rupture, followed by detonative pressure release. Marine experience shows that a compressible gaseous volume confined by incompressible liquid reverse flow can exert sufficient pressure to cause pressure within the bubble to exceed that of its liquid medium quickly, with an opposite release of energy in the form of reactive expansion—an explosive eruption. High velocity, highly compressed narrow air streams, act as liquid, incompressible media, and thus the marine experience can be duplicated in flow separation and reversal.

Rupture of whorl pockets in the boundary layer will cause shock waves emanating from the afterwake, blade upper surface, traveling upstream to the leading edge. This may cause stall and blade disintegration.

The U.S. Navy devised a continuous propulsive marine screw, and in tests, eliminated much of the cavitation. My invention is that of a compressor as a continuous, progressive, multiple screw within a housing 131, where lead 132, pitch 133, space 134, depth 135, blade angle 136, and helix angle 137, all change continuously within each blade rotation. Lead, pitch, space, and depth all gradually decrease, while blade angle and helix angle increase, in order to impart high compression and increased velocity to the intake volumes as they are released into the intake precombustor nozzle, devoid of multiple stream velocities, leading or trailing edge vortices, or downwashes and the problems of air-fluid cavitation. Thus, a very short light compressor of small dimensions in diameter, produces the work of a large annular compressor phase, and/or in conjunction with a pulsating and very limited positive displacement roots, vane or other similar type blower with their volumetric, compression, velocity and cyclical delivery drawbacks. The latter would not be satisfactory for this invention.

Three types of this invention compressor of many possible are illustrated.

Figure 11A:
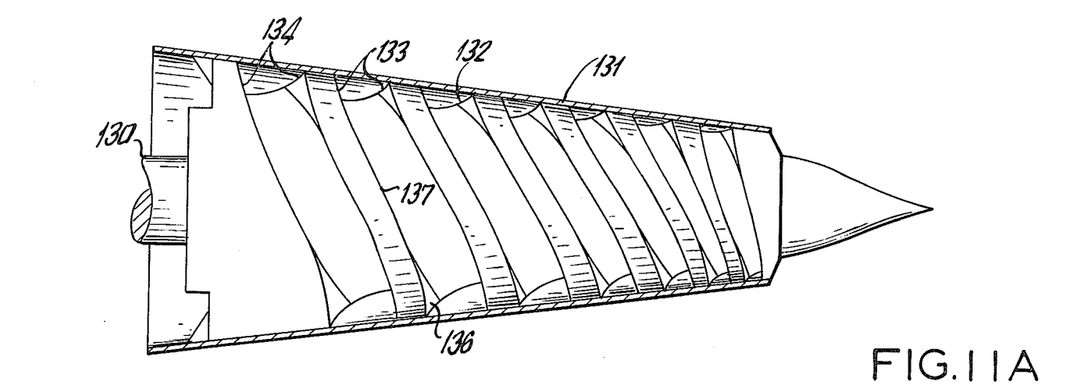

[A] shows a tapered design multiple blade continuous axial flow compressor, wherein the other diameter diminishes downstream with the above changes. This is a square blade type with a blade flat.

Figure 11B:
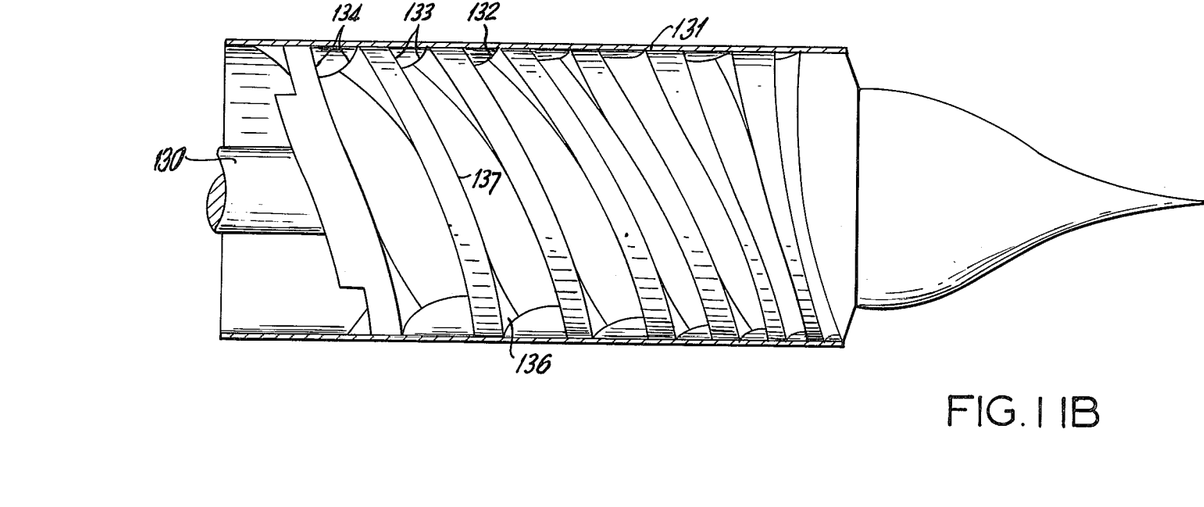

[B] shows a constant outer diameter compressor as of the above type in [A].

FIG. 11 shows a tapered design with no blade flat, having its space in a pronounced radius and the compressor body inner diameter diminished downstream, while its outer diameter remains constant. Its adaptability is particular for an annular combustion chamber.

Figure 12:
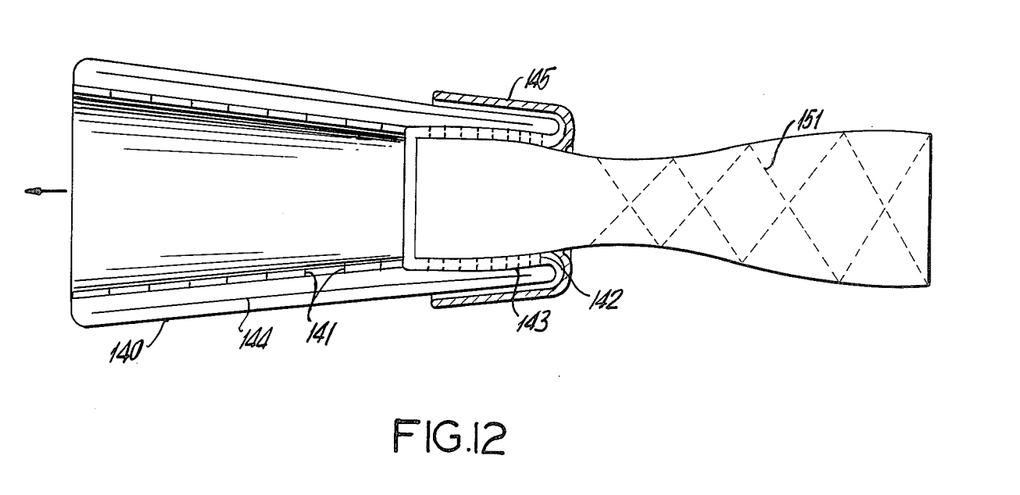
FIG. 12 illustrates a heat pipe device for the compression of FIG. 11 and its diffuser nozzle.

FIG. 12 illustrates a device to improve the efficiency of both intake diffuser-nozzle and the mainstream's maximum transfer potential at the pre-chamber throat.

It is commonly known that high throat intake temperatures in present gas turbine engines produce high resultant thrust recovery pressures. The specific compressor for this invention in FIG. 10 generates considerable heat. Some of it will be absorbed by the vane walls and the rest by the compressor's outer-peripheral housing walls. This heat would be lost by radiation to the exterior, where if an outer shield is present, a limited percentage can be transported in a stream for exhaust augmentation. However, it is much more efficient to transfer for this heat directly to the injured catoly-following diffuser-nozzle downstream, and because of the immediate proximity, avoiding transportation losses. In addition, this heat can be used where its application will be unoxidized, the pre-chamber intake.

Ferri's research determined that regenerative cooling with its heat transferred to the burner or the mainstream at the combustor, produced highest efficiencies for mixing and combustion.

The specific devise for this invention to accomplish the above is a form of heat pipe.

A shroud 140, surrounds the top and bottom of the progressive axial flow compressor exterior and rotates with it. It is closed on the upstream end and extends as a tube around the diffuser-nozzle length downstream, attached to the compressor by numerous finned struts 141, and closed at the downstream end of the compressor.

Both the outer wall of the diffuser-nozzle and the outer surface of the proximal end of the shroud are fixed, 142 and 143. A heat insulating divider 144, separates the shroud into two longitudinal halves, except for the ends which are not attached, and hence any fluid medium may pass to either half. A baffle, 145, covers the downstream heat pipe end, but is open upstream. Air will enter here and bring heat from the pipe to the diffuser wall, as well as seal the compressor-diffuser junction.

An appropriate heat transferable medium, such as Freon gas, will move from the compressor surface in the shroud tube to its end post the divider and displace the cold Freon there—giving up heat to be transferred to the diffuser-nozzle walls. The Freon gas thus cooled is displaced back to the compressor to absorb heat and complete the continuous closed cycle, aided by the heat shroudpipe's notation.

Figure 13:
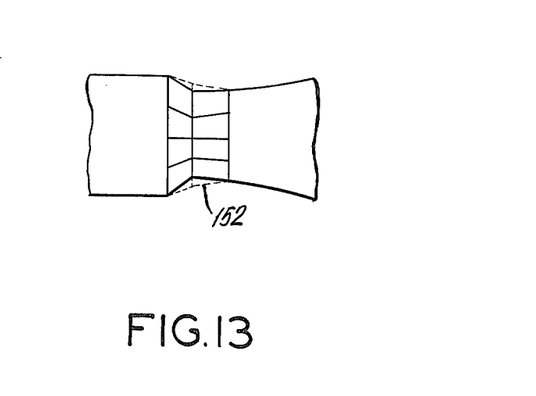
FIG. 13 illustrates the diffuser-nozzle for the pre-chamber entry with entry area 71, Busemann-Prandtl nozzle 72 and alternate fixed or variable area convergence 73.

FIG. 13 shows the oblique, reflected shock pattern 151, of the Busemann-Prandtl diffuser-nozzle used and an optional variable gemoetry convergence area for pressure-flow variations.

An alternate embodiment of this combustion process includes:

a. a Busemann-Prandtl supersonic intake nozzle-diffuser with self-cancelling shock waves.

b. a forward double wedge center body to create two double boundary layer systems for aspiration fuel injection, mixing and the flameholding forward combustion area at its trailing surface. Fuel is brought under pressure to the porous wedge surfaces from within the wedge body. Aerodynamically-swept struts with a maximum thickness 55% downstream of the leading edges support the wedge and serve as fuel conduit.

c. the wedge in item b is followed by oblique plane surfaces for stream flow separation. These may consist of oblique plane bodies or plates. With the bodies, one of approximately 40% of the volume of the conduit is matched slightly downstream by its opposite equivalent body attached to the opposite wall. The upstream body generates oblique shock wave behind the wedge body for initial flameholding and combustion for the main combustion for the main combustion chamber. In addition, the latter body directs the burning cool streams into the main combustion chamber.

d. an expanding main combustion chamber develops flame propagation for complete combustion, in which downstream after-plane oblique surfaces attached to those upstream, complete the oblique plane bodies and assure combustion within the central region via reflective shock waves. Augmentation by ejector air slots in the walls provides cooling and volume at the downstream end of the main combustion chamber.

e. the combustion chamber and its components may take many forms, but are always a single, basic, progressive structure.

f. a combustor may be a self-contained unit, an annular combustor or a plurality of combustors in a larger unit.

g. components may be specified as to type, specific modification, arrangement or combination to meet prescribed parameters.

Evidently, the objects of this invention are accomplished via effective utilization of a single, initial, compressed, supersonic airstream, wherein its physical properties are employed to affect highly efficient and almost drag-free mixing and detonative ignition, followed by an extended supersonic combustion sequence, all within one continuous, unitary process for complete combustion. In addition, every phase from fuel injection, mixing, ignition, and flameholding to flame propagation and combustion remains, rigidly confined to its area and stable over any variation of velocity, temperature or static pressure within the supersonic regime— while common, low-cost, readily-available, easily stored and handled high or low density fuels are wholly applicable.

Whereas extended combustion has the calculatory effect of completion and chemical re-association in this process, the additional benefit of more rapid and short combustion distances, with short, light combustors is further achieved by the calculated angular variations of the deflector plates or bodies.

Exceptional flexibility ranges from the subsonic to the high supersonics, for direct use in gas turbine engines for stationary propulsion to propulsion jets for aircraft with supersonic regimes. Furthermore, these combustors can be separate ramjets or scramjets or in multiple systems, individually or as a large power system.

In all cases, each combustor remains a self-contained unit with no auxiliary system. Those illustrated in the accompanying drawings, only some of those possible, can be utilized to tailor design the combustor process to meet specific preassembled parameters.

The absence of chokes and radical velocity changes without work transference assure high heat transference, unimpeded stream flow, exemplary fuel consumption and luminosity deterence for high overall thermal and potential work efficiency, minimum drag, genuine parallel aspiration fuel injection and mixing, is an inherent part of the process, as is shock wave ignition and stream burning, both boundary layer and area, and in which flame propagation takes its form of development through stabel shock, expansion, contraction and reflective wave generation. Because of the components and principles of the process, variations in initial intake stream velocity or compression ratio in no way change the location or the function of each phase of the process or their relative value to each other. Consequently, normal operating efficiencies coincide with optimum potential efficiencies.

Though specific forms of embodiment of this invention in principles and description herein above in connection with the accompanying drawings have been offered, they are merely examples, with no desire or intent that the invention be thus limited. It is understood of course, that numerous modifications and changes may be made by the exercise of skill in the art without departing from the spirit and scope of this novel concept, and it is intended here to cover all modifications by the applied claims.

We claim the following as new and desire to secure by Letters Patent of the United States:

1. A method of supersonic combustion for operating an engine having a combustion chamber, a wedge therein with a porous surface for supporting and producing a stream of fuel, means for injecting fuel under pressure to said porous surface of the wedge, and at least one oblique plane surface within said combustion chamber arrayed in the path of said stream of fuel comprising the steps of:
   a. forming at least one centripetally coalescent stream of fluid at supersonic velocity;
   b. impinging said stream of fluid against said porous surface of said wedge;
   c. injecting simultaneously with steps (a) and (b) fuel to said porous surface of said wedge and thereby further forming a combustible admixture; and,
   d. immediately thereafter auto-igniting the combustible admixture by flowing said admixture against said oblique plane at supersonic velocities.

2. A method as described in claim 1 further including the step of separating said centripetally coalescent stream into a first separated stream dorsol to the central axis of said combustion chamber and a second separated stream ventral to the central axis of said combustion chamber.

3. A method as described in claim 2 wherein said first and said second separated streams between are $7\mu$ and $15\mu$ in thickness.

4. A method as described in claim 1 wherein step (a) comprises the substeps of admitting an incident gaseous oxidant volume thereinto and modifying said volume by equi-convergent-divergent diffusion.

5. A method of supersonic combustion for operating an engine having a special Busemann-Prandtl converging-diverging nozzle for first stage; a second stage of a wedge center body incorporating porous upstream surfaces for aspiration fuel injection, a third stage of obtuce-angled deflection surfaces facing the wedge center body trailing surface upstream; a fourth stage immediately rearward having specific deflector surface in second combustion chamber, from which the exhaust exits to another Busemann-Prandtl nozzle in a sixth stage; comprising the following steps:
   (a) forming at least one centripetally coalescent stream of fluid at supersonic velocity at said first stage;
   (b) impinging said stream of fluid against said porous surface of said wedge center body;
   (c) injecting simultaneously with steps (a) and (b) fuel to said porous surface of said wedge center body and thereby further forming a combustible admixture; and,
   (d) immediately thereafter auto-igniting the combustible admixture by flowing said admixture against said obtuse-angled deflection surfaces at supersonic velocities.

6. A method as described in claim 5 further including the step of separating said centripetally coalescent stream into a first separated stream dorsol to the central axis of said combustion chamber.

7. A method as described in claim 6 wherein said first and said second separated streams are between $7\mu$ and $15\mu$ in thickness.

8. A method as described in claim 5 wherein step (a) comprises the substeps of admitting an incident gaseous oxidant volume thereinto and modifying said volume by equi-convergent-divergent diffusion.

* * * * *